(12) United States Patent
Ezumi (10) Patent No.: US 7,436,819 B2
(45) Date of Patent: Oct. 14, 2008

(54) COMMUNICATION APPARATUS AND CONTROL METHOD THEREOF

(75) Inventor: Yosuke Ezumi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 10/760,355

(22) Filed: Jan. 21, 2004

(65) Prior Publication Data
US 2004/0151165 A1 Aug. 5, 2004

(30) Foreign Application Priority Data
Jan. 24, 2003 (JP) .............................. 2003-016712

(51) Int. Cl.
*H04L 12/66* (2006.01)
(52) U.S. Cl. ........................................ 370/352; 370/386
(58) Field of Classification Search .................. 370/354
See application file for complete search history.

(56) References Cited

U.S. PATENT DOCUMENTS

| 6,243,377 B1* | 6/2001 | Phillips et al. ............... 370/354 |
|---|---|---|
| 6,859,451 B1* | 2/2005 | Pasternack et al. .......... 370/352 |
| 2001/0012282 A1* | 8/2001 | Yegoshin ..................... 370/338 |
| 2002/0089975 A1* | 7/2002 | Vaziri et al. .................. 370/352 |
| 2002/0122417 A1* | 9/2002 | Miller et al. ................. 370/352 |
| 2002/0164003 A1* | 11/2002 | Chang et al. ............. 379/93.05 |
| 2002/0172209 A1* | 11/2002 | Ohta et al. ................... 370/401 |
| 2003/0053446 A1* | 3/2003 | Kwon .......................... 370/352 |
| 2003/0202462 A1* | 10/2003 | Smith et al. .................. 370/216 |
| 2004/0001501 A1* | 1/2004 | Delveaux et al. ............ 370/442 |
| 2006/0153108 A1* | 7/2006 | Nakajima .................... 370/286 |

* cited by examiner

Primary Examiner—Creighton H Smith
(74) Attorney, Agent, or Firm—Fitzpatrick, Cella, Harper & Scinto (57) ABSTRACT

The present invention aims at providing a communication apparatus accommodating both a LAN line or a broadband line and an ordinary public network (PSTN) so as to enable the simultaneous use of two lines according to two network connection methods by using a single physical line capable of accommodating the high-speed line and the public network.

There are provided an IP phone having an interface for connection to an Internet line and an analog telephone having an interface for connection to a PSTN line. A control section selects an Internet telephone or a public network telephone to be used. While one telephone line is busy, the other idle line is used for communication.

3 Claims, 9 Drawing Sheets

COMMUNICATION APPARATUS AND CONTROL METHOD THEREOF

BACKGROUND OF THE INVENTION

1. Field of the Invention

The present invention relates to a control technology of a communication apparatus to perform telephone communication via a public network and telephone communication via the Internet.

2. Description of the Related Art

In recent years, the Internet is rapidly spreading worldwide. Communication devices using the Internet are proposed in various forms. Particular attention is paid to Internet phones and IP phones because they are expected to remarkably decrease communication charges.

An IP phone requires IP connection between users who want to communicate with each other. For this purpose, a rendezvous server is provided on the Internet. A telephone call is established as follows. The rendezvous server is provided with a table that maintains correspondence between telephone numbers and nearby Internet service providers. A receiving user is notified of a call request and an originating user's IP address via the public network. Both users are simultaneously connected via the rendezvous server to thereby establish speech communication.

The Internet phone is used in two modes: dial-up connection via Internet service providers and continuous and direct interconnection (that is, always-on connection) via a LAN.

When the former mode is used for dial-up connection via an Internet service provider, the Internet service provider permits a terminal equipment to make a PPP-connection to the Internet only when a connection request occurs. Accordingly, a normal Internet procedure cannot directly call an individual who makes a dial-up connection via an Internet service provider.

The former is based on dial-up connection, uses the PSTN line to connect to a provider, and then uses a data modem for connection. Therefore, call signals and control data cannot be used independently, thus occupying the communication line. As a result, this mode has made it impossible to use two lines simultaneously by changing between the PSTN phone and the IP phone using a single terminal equipment.

On the other hand, the latter mode, i.e., the continuous and direct interconnection via a LAN has come into practical use as an original IP phone using a speech coding/decoding function, a network processor having call connection processing, and the like. Many proposals for IP phones concern methods of interconnecting terminal equipments that are continuously connected to the Internet. A complicated configuration may be needed for the use of telephones. For example, an ordinary analog telephone set needs to be connected to a splitter. Further, a DSL modem needs to connect with a terminal equipment connectable to the LAN.

There has not been proposed a technique that can realize the use of two lines, i.e., the continuous connection line (or always-on connection) and the PSTN line with a simple configuration. Such dual terminal equipment is especially necessary for a situation where there is a plurality of types of public networks.

SUMMARY OF THE INVENTION

The present invention has been made in consideration of the foregoing. It is therefore an object of the present invention to provide a communication apparatus accommodating both a LAN line or a broadband line and an ordinary public network (PSTN) so as to enable the simultaneous use of two lines according to two network connection methods by using a single physical line capable of accommodating the high-speed line and the public network.

DESCRIPTION OF THE PREFERRED EMBODIMENTS

Preferred embodiments of the present invention will be described in further detail with reference to the accompanying drawings. Unless otherwise specified, the scope of the present invention is not limited to relative dispositions of constituent features or components, display screens, and the like described in the embodiment.

Figure 1:
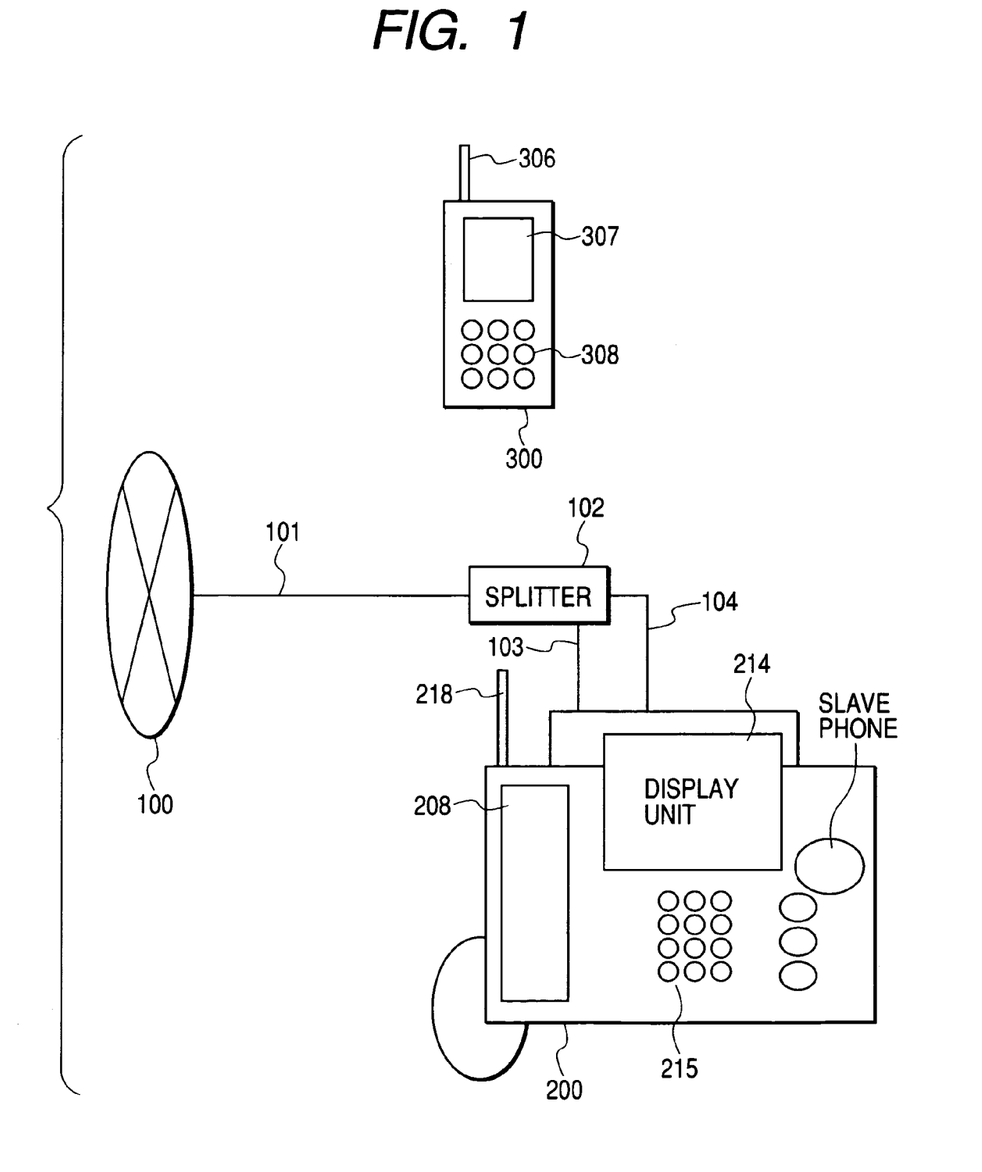
FIG. 1 shows a configuration of a communication system including a communication terminal equipment according to an embodiment.

FIG. 1 shows a configuration of a communication system including a communication terminal equipment according to the embodiment.

In FIG. 1, a public network 100 is connected to a terminal equipment via a wired line (or fixed line) 101. According to the embodiment, the wired line 101 corresponds to ADSL. Accordingly, a splitter 102 is provided to split the wired line 101 into a PSTN band 104 and an ADSL network band 103.

Since the ADSL line uses physically the same line as the public network, a single line can provide two communication functions. This is one of digital technologies (xDSL) that use a conventional telephone line (metal cable) generally called a "subscriber line" to enable high-speed data transmission via a special modem 232 to be described later. Presently, ADSL is the most popular xDSL technology and features an asymmetric difference between "upstream" and "downstream" speeds, i.e., transmission speed and reception speed viewed from a user. A pair of subscriber lines is capable of up to 512 kbps upstream and up to 8 Mbps downstream for communication.

However, speech data used for IP phones, when compressed by the PCM codec, becomes 64 kbps according to μ-law/A-law (ITU-T G.711). More highly efficient compression techniques are used. Since the G.723.1 CELP coding results in approximately 6 kbps, for example, ADSL can be the sufficient backbone for IP phones. The other xDSL technologies include: HDSL using a plurality of pairs of subscriber lines; and VDSL as a ultra high-speed version of ADSL.

A metal cable for telephones originally used for speech communication uses just a small part of copper wire's frequency (300 Hz to 3.4 kHz, called a 4 kHz band).

ADSL uses a high-frequency bandwidth exceeding the 4 kHz band for broadband data communication.

This makes it possible to implement two different communication methods using a single physical line.

There are two standardized ADSL types: Recommendation G992.1 G.dmt (full-spec) using a band of up to 1.1 MHz and Recommendation G.992.2 G.lite (half-rate) using a band of up to 552 KHz, i.e., half of G992.1 G.dmt. Expanding a band to the broadband increases a transmission speed, but interferes speech communication, causing disadvantage of requiring the splitter 102.

Available lines include optical fiber lines, CATV lines, and wireless lines.

The reference numeral 200 represents an information terminal equipment (also referred to as a communication terminal equipment) that functions as a master phone of a wireless connection device. The reference numeral 300 denotes a wireless telephone set (slave cordless phone) that functions as a slave phone of the information terminal equipment 200 and wirelessly connects thereto.

In the information terminal equipment 200, the reference numeral 214 represents a master phone's display unit, 215 a master phone's operation unit, 208 a handset for call input/output, and 218 a master phone's antenna for wireless communication with the slave phone 300.

In the wireless telephone set 300, the reference numeral 307 represents a slave phone's display unit, 308 a slave phone' operation unit, and 306 an antenna for wireless communication with the master phone 200.

Figure 2:
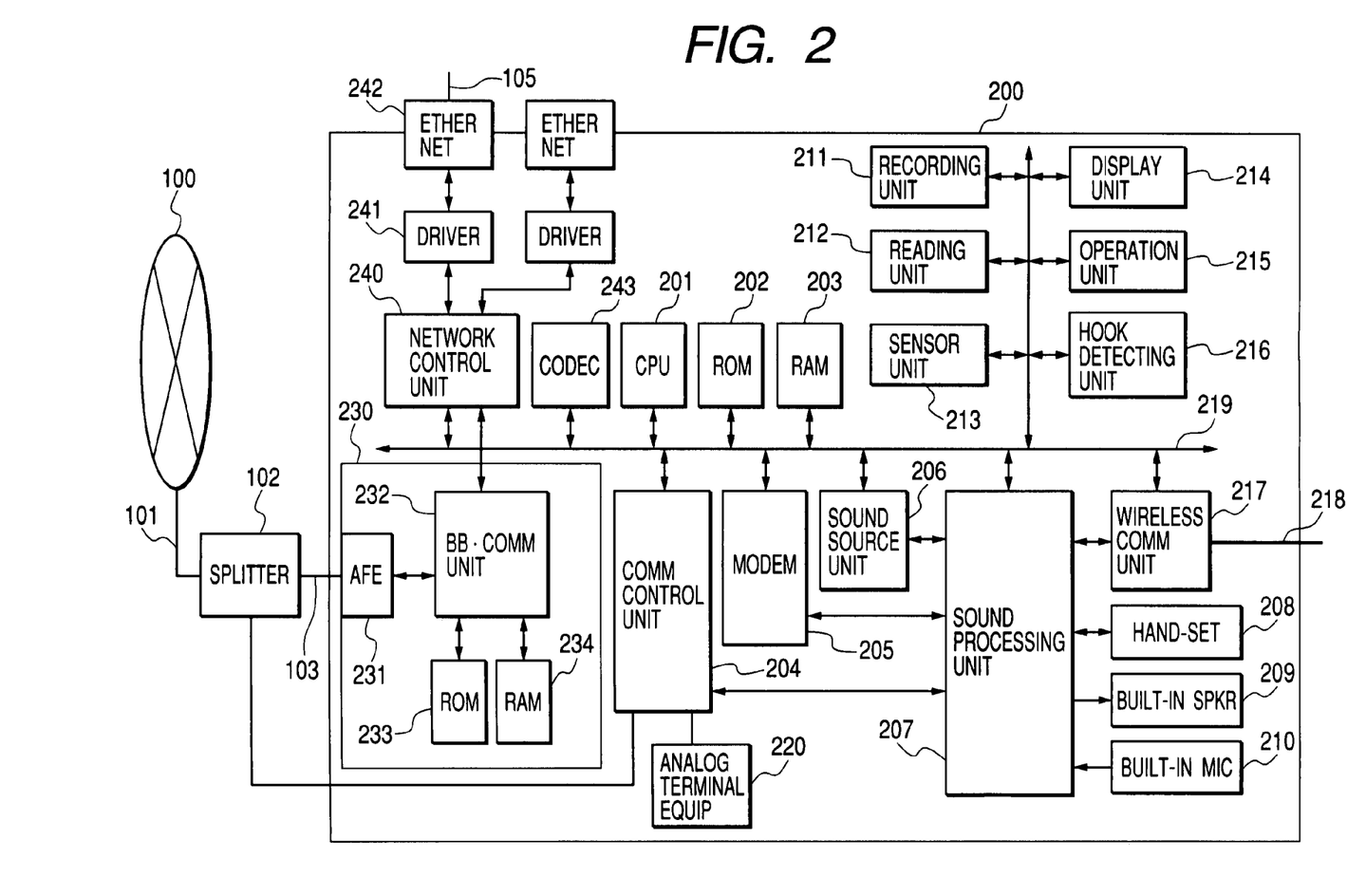
FIG. 2 shows an internal configuration of an information terminal equipment according to the embodiment.

FIG. 2 shows an internal configuration of the information terminal equipment (master phone) 200 according to the embodiment.

A CPU 201 is supplied with input signals from the units via a data bus 219 and, based on the input signals, controls the constituent elements connected to the data bus 219. That is to say, the CPU 201 controls the entire elements in accordance with a control program stored in ROM 202 and controls connection to network and various protocols and executes processes. Of course, the CPU 201 also provides control over operations, display, reading, and recording.

The ROM 202 is memory that stores the control program and specifically comprises mask ROM, flash ROM, and the like. The ROM 202 may comprise flash ROM and EEPROM for data that needs to be written or deleted.

The RAM 203 is used as a work area for processing by the CPU 201 such as Web browsing including call processing or sending and receiving mail. The RAM 203 is also used for reading and recording data or processing speech CODEC data. Unlike the ROM 202, the RAM 203 temporarily records data.

Further, the RAM 203 contains a battery-backed part that stores setup contents of various services such as time data and contents registered to a telephone directory. The RAM 203 may comprise EEPROM and the like as nonvolatile memory.

The communication control unit 204 serves an interface which accommodates an analog (PSTN) line 104. For an analog line, the communication control unit 204 comprises a polarity matching circuit, a ringer detection circuit, a pulse transmission circuit, and a transducer circuit. The polarity matching circuit for matching line voltage polarities comprises a diode-based full-wave rectifier circuit and is connected to an office exchanger's telephone line (hereafter referred to as a subscriber line). The ringer detection circuit is connected to the circuit office exchanger's subscriber line and detects a ringing signal from the office exchanger. The pulse transmission circuit forms a line loop in response to an off-hook operation and transmits a dial pulse to the office. The transducer circuit performs 2-to-4-wire conversion.

The communication control unit 204 is provided with an interface 220 for connection with ordinary analog terminal equipment to be connected to the outside.

The MODEM 205 comprises a DSP and an AFE (analog front end). Under control of the CPU 201, the MODEM 205 provides a function of a fax modem for G3 faxing. Further, the MODEM 205 has a number display function to analyze modem data (number display data) and an echo canceler function, and is capable of a speaker phone function.

The sound source unit 206 is a sound source for a holding tone and ring melodies (melodies issued upon reception of a call) and has a sound data generation function inside. Under control of the CPU 201, the sound source unit 206 outputs data stored in the ROM 202 and the RAM 203 as analog signals. The sound source unit 206 also works as a sound source for call progress tones such as pseudo DT, BT, and RBT.

The reference numeral 207 represents a sound processing unit. Under control of the CPU 201, the sound processing unit 207 performs speech path control of signals from the MODEM 205 and input/output signals for the sound source unit 206, a handset 208 to be described, a speaker 209, a built-in microphone 210, a wireless communication unit 217, and the communication control unit 204.

The reference numeral 208 represents a handset to input and output the voice. The reference numeral 209 represents a speaker to output a ringing tone and stored voice data and to monitor a speaker phone's incoming call. The reference numeral 210 represents a built-in microphone to input the voice for the speaker phone function. The reference numeral 217 represents a wireless communication unit to modulate control data and voice signals, convert them into forms capable of wireless transmission, and transmit them to an antenna 218. The wireless communication unit 217 extracts demodulated data from information wirelessly received from the antenna. The wireless communication unit 217 outputs control data to the CPU 201 and a voice signal to a crosspoint switch 207. In digital cordless mode, a CODEC unit 243 to be described later can also process digital voice.

The reference numeral 211 represents a recording unit comprising known means such as a thermal printer, a thermal transfer printer, a laser beam printer, and an ink jet printer. For fax recording, the recording unit 211 decodes MH, MR, or MMR encoded digital data and uses the decoded data as print data for printing. When printing data from within a browser, the recording unit 211 uses the RAM 203 as a receiving buffer. The recording unit 211 converts one web page of data into display data wherein the web page data is stored in the RAM 203 and is coded in a markup language. A display buffer in the RAM 203 stores the converted data whose size can be displayed on the display unit 214 at once. Upon completion of storing data in the display buffer, the browser notifies the recording unit 211 of an instruction to start printing.

When notified that the browser has buffered the data, the recording unit 211 reads the data from the display buffer, converts the data into print data on a line basis, and transfers it to the recording unit 211. Upon completion of the data transfer, the recording unit 211 notifies the browser that the data has been transferred. When notified that the data has been transferred, the browser stores the next display data, if any, in the display buffer and notifies this to the recording unit 211. When detecting the end of data per web page and finding no data to be displayed next, the browser notifies the end of page. The above-mentioned process is repeated to transfer one page of data to the recording unit 211 for web printing The reference numeral 212 represents a reading unit comprising known document reading means such as a CCD and a close-contact sensor array. When the reading means reads analog data, the reading unit 212 converts this data into digital data. Further, the reading unit 212 encodes the converted digital data using known encoding techniques such as MH, MR, and MMR for output.

The reference numeral 213 represents a sensor unit to detect the presence/absence or the size of a transmission document on the reading unit 212 and notify the result to the CPU 201. Further, the sensor unit 213 detects the presence/absence or the size of recording paper on the recording unit 212 and notify the result to the CPU 201.

The reference numeral 214 represents a display unit to display not only HTML information received from a server on the Internet, but also the time and states such as line states in communication and errors. The display unit 214 mainly comprises liquid crystal parts such as a color or monochrome LCD.

The display unit 214 also displays a received text message or a text message entered from an operation unit 215 for keyboard input and the like. In addition, the display unit 214 displays setup contents of various service functions provided for the telephone set.

The operation unit 215 comprises a keyboard, a pointing device, or a key. Along with the display unit 214, the operation unit 215 provides the user interface. The operation unit 215 accepts operator operations for web browsing, printing, call origination, call reception, and registration, and notifies the CPU 201 of the operator operations. The operation unit 215 comprises various keys. For example, the keys include: dial keys such as digits 0 to 9 and symbols * and # for entering dial numbers, URLs, alphabetics, and codes; send and receive keys to control faxing; an off-hook key to turn on or off the line; a holding key; and a selection key to set up functions.

The reference numeral 216 represents a hook detecting unit to especially detect an on/off-state of the handset for on/off control of the line.

The network control unit 240 controls various Internet communication protocols, i.e., International Telecommunication Union (ITU) recommendations such as IP (Internet Protocol), UDP (User Datagram Protocol), RTP (Transport Protocol For Real-Time Application), and RSVP (Resource Reservation Protocol). When a voice signal is input from the handset 208, the network control unit 240 processes that signal via the sound processing unit 207 using the above-mentioned protocols and MAC addresses, i.e., hardware addresses configured to identify on the network. Further, the network control unit 240 uses the CODEC unit 243 to perform CODEC processing for voice processing, and progressively codes and transmits signals according to G.711, G.729 standards, etc. Likewise, the network control unit 240 receives voice data.

The network control unit 240 also executes call control for IP phones, i.e., protocols such as SIP, H.323, and MCGP.

These protocols are individually known procedures.

Here, there is provided a router function to relay between networks. This hardware is installed at a transfer point between different networks and correctly delivers data transmitted via networks to an intended destination. There is also provided a NAT function is the router.

The NAT function converts a private IP address into an original global IP address capable of accessing the Internet, and vice versa. This function allows a node assigned with only a local IP address to transparently access the Internet.

There is also provided a DHCP function, i.e., a protocol to dynamically assign an IP address at startup and retrieve that IP address at termination. Moreover, a security function is provided by PAP/CHAP and the like. A UTOPIA interface connects the network control unit 240 to an ADSL modem 230 as a unit for connection with the line. For Ethernet connection as an external interface, signals from the network control unit 240 can be connected to a driver 241 (generally called PHY) connected to an MII interface.

The ADSL modem 230 is a communication control unit used for Internet connection and is connected to the public network split by the splitter. The ADSL modem 230 comprises an AFE unit 231 and a BB-communication unit 232 connecting with ROM 233 as a storage for an ADSL modem program and RAM 234 as a data work area. The ADSL modem 230 is connected to the network control unit 240 via the UTOPIA interface. This part corresponds to a means for continuous connection with the IP network and may be capable of optical connection, the other DSL connection technologies, wireless connection, and the like.

Figure 3:
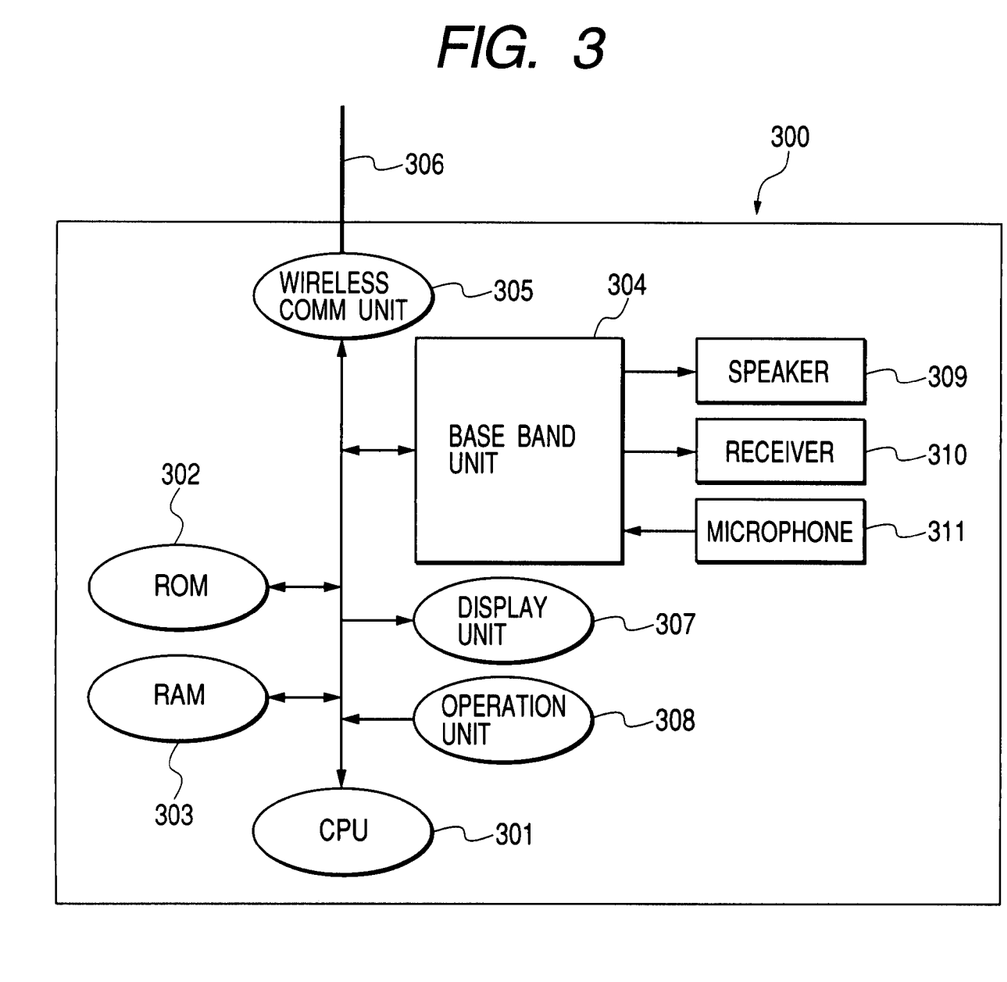
FIG. 3 shows an internal configuration of a wireless telephone set according to the embodiment.

FIG. 3 shows an internal configuration of the wireless telephone set (slave phone) 300 according to the embodiment.

The CPU 301 controls the entire of the wireless telephone set 300. The reference numeral 302 represents ROM to store a control program for the CPU 301. The ROM 302 may comprise EEPROM or flash ROM. For example, the EEPROM stores a calling code (system ID) of the wireless communication system, wireless telephone set's slave phone number IDs, and the like. The flash ROM stores text data in mail received from the master phone, telephone directory data, and the like. The RAM 303 is used as a work area for control of processing by the CPU 301.

An operation unit 308 comprises dial keys used for entering dial numbers etc. and function keys such as an extension key, a holding key, a speaker key, and a telephone directory key.

A display unit 307 displays call reception, a dial number entered from the operation unit 308, and the public network utilization.

A baseband unit 304 has a modem compander, and privacy and amplification functions to enable transmission and reception of control data and voice signals. A modulated signals from the baseband unit 304 is transmitted to the master phone via a wireless communication unit 305 to be described alter. A modulated signal from the wireless communication unit 305 is demodulated. A control signal is output to the CPU 301. A voice signal is output to a speaker 309.

The wireless communication unit 305 converts the modulated signal from the baseband unit 304 into a form capable of wireless transmission and sends the converted signal to an antenna 306. In addition, the wireless communication unit 305 extracts a modulated signal from a signal wirelessly received from the antenna 306 and outputs the modulated signal to the baseband unit 304.

A microphone 311 inputs speech voice signals. A speaker 309 outputs voice signals with an amplified volume and generates a ringing tone. A receiver 310 outputs speech voice signals.

Figure 4A:
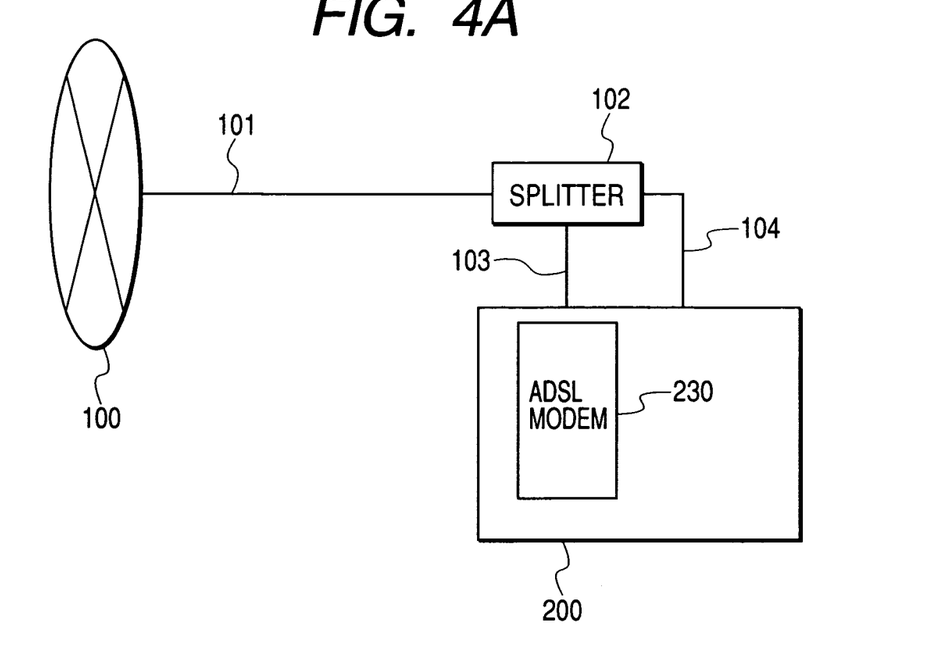
FIG. 4A shows a configuration example of connection between an information terminal equipment and a public network.
Figure 4B:
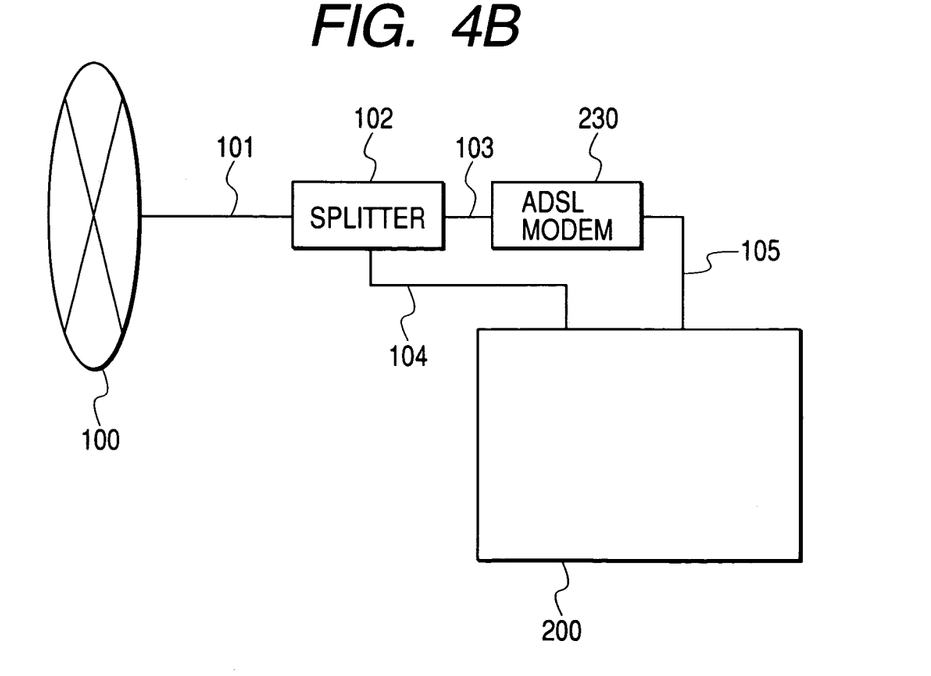
FIG. 4B shows another configuration example of connection between the information terminal equipment and the public network.

FIGS. 4A and 4B show configuration examples of connection between the information terminal equipment 200 and the public network 100. While the following describes two representative configurations, the present invention is not limited thereto.

According to the configuration in FIG. 4A, the information terminal equipment 200 contains an ADSL modem. This configuration complies with the description for FIGS. 1 and 2.

The configuration in FIG. 4B uses an external ADSL modem. According to this configuration, the splitter 102 is connected to the ADSL network band line and to the ADSL modem 230. The later part corresponds to an Ethernet (registered trademark) interface (LAN) that is LAN-connected to the information terminal equipment 200 via a connection line 105. In this case, according to the detailed block diagram in FIG. 2, the connection line 105 is connected to an Ethernet (registered trademark) unit 242 and leads to the system via the driver 241.

In FIG. 4B, a set of the splitter 102 and the ADSL modem 230 may comply with the other broadband interfaces. For example, it may be preferable to use a DSL modem according to the other systems, a media converter as the optical fiber interface, or a CATV modem.

This concerns a method of physical interface with the line. The information terminal equipment 200 can be provided with a unit for connection to the Ethernet (registered trademark) interface (LAN) to enable connection to the physical interface with the line.

Figure 5:
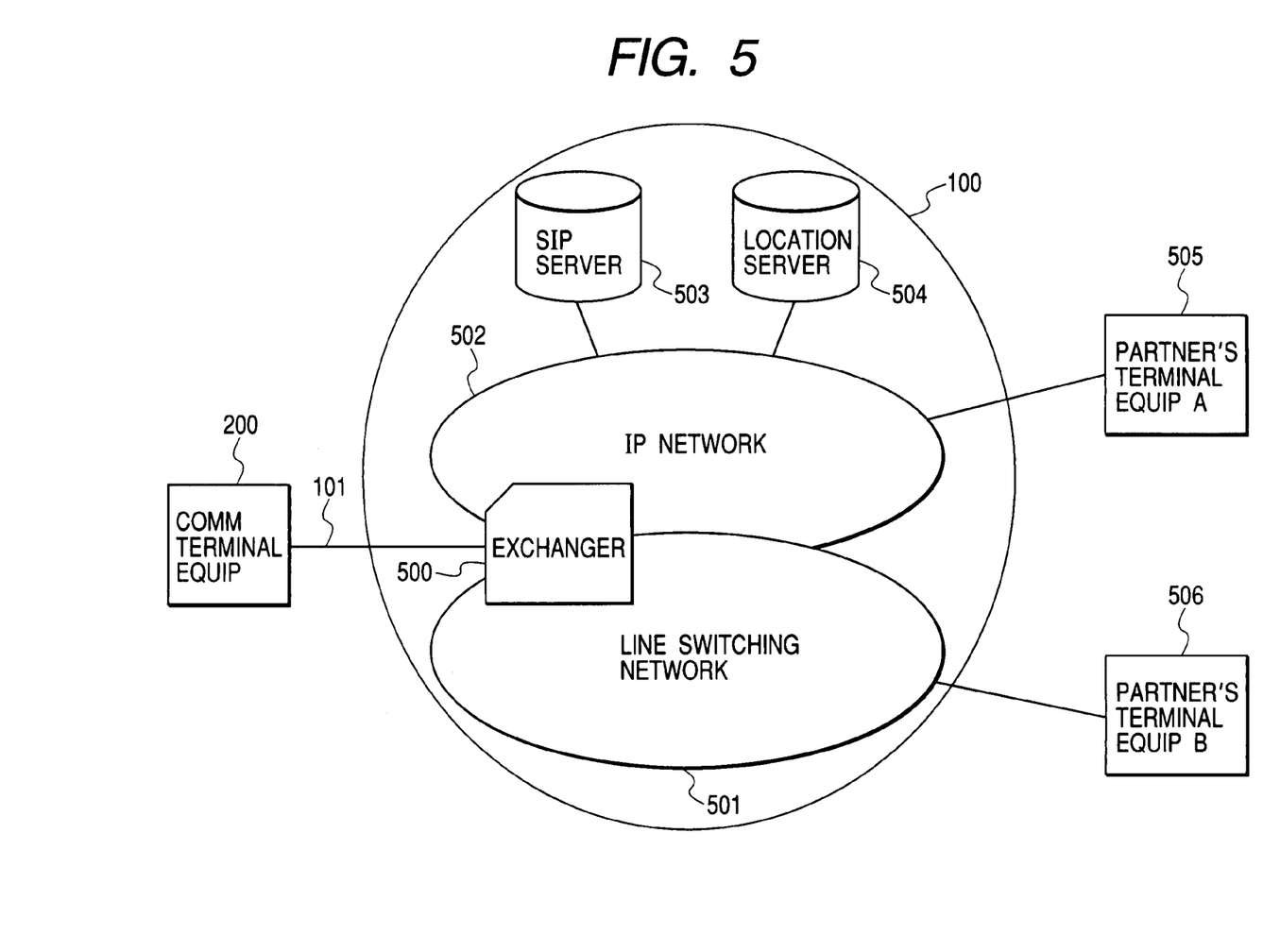
FIG. 5 schematically shows a network including the public network according to the embodiment.

FIG. 5 schematically shows a network including the public network 100 according to the embodiment.

The information terminal equipment 200 is connected to the public network 100 through the wired line (public network) 101. The information terminal equipment (communication terminal equipment) 200 is connected to the public network 100 through an exchanger 500. The exchanger 500 switches the public network 100 to a line switching network 501 or an IP network 502 to each of which the information terminal equipment 200 is connected. There is formed one-to-one connection between the exchanger 500 and the information terminal equipment 200. The line switching network 501 is provided with a subscriber board. The IP network 502 is provided with a DSLAM board.

Each network is connected to partner's terminal equipment. For the line switching network 501, an ordinary PSTN line uses line switching to make connection between exchangers, thus making connection to partner's terminal equipment B 506.

Next, the IP network 502 will now be described by using SIP protocol as an example.

Let us consider that messages are exchanged between the information terminal equipment 200 to request connection and an SIP server 503 to make connection in response to the request. When placing a call, the information terminal equipment 200 sends a message to the SIP server 503 to request connection to partner's terminal equipment A 505. The SIP server 503 inquires a location server 504 of an address of the partner's terminal equipment A 505, and then obtains the address to establish connection to the partner's terminal equipment A 505. In this manner, the information terminal equipment 200 can connect to the partner's terminal equipment B 506 and the partner's terminal equipment A 505 that are connected to the line switching network 501 and the IP network 502, respectively.

Speech connection operations on the information terminal equipment 200 will now be described.

First, the following describes operations to connect to the line switching network 501.

Lifting (or hooking off) the handset 208 on the information terminal equipment 200 allows the hook detecting unit 216 to start seizing the line. This operation aims at making connection between the handset 208 and the public switched telephone network (PSTN) 104. For this purpose, the sound processing unit 207 configures a speech path. The communication control unit 204 forms a DC loop for connection to the network. The network detects this loop and sends a dial tone. When the operation unit 215 is operated for tone dialing, the MODEM 205 generates a DTMF signal. The communication control unit 204 transmits the signal to the line via the sound processing unit 207. For pulse dialing, the communication control unit 204 the pulse transmission circuit in the communication control unit 204 generates the dialed signal. According to the dialed signal, the network connects to the partner's terminal equipment B 506 to establish the speech on the line switching network 501.

Second, the following describes operations to connect to the IP network 502.

Lifting the handset 208 on the information terminal equipment 200 allows the hook detecting unit 216 to start connecting to the IP network. A pseudo dial tone is generated under control of the communication control unit 204 and is transmitted to the handset 208 via the sound processing unit 207. The MODEM 205 can also generate a pseudo dial tone.

When the operation unit 215 is operated for dialing, the input dial data is converted into a protocol for Internet communication via the network control unit 240 for connection operations. First, the call connection takes place in accordance with the SIP protocol as before-mentioned. The network control unit converts the data into an IP packet. The ADSL modem 230 requests the network for the IP packet as a UDP/IP packet. When the call is established, the voice packet communication takes effect. The voice from the handset 208 is subject to path control in the sound processing unit 207 and is subject to voice coding in the CODEC unit 243. It provides voice conversion such as G.711 PCM coding. The network control unit 240 converts the call into an IP packet and sends it to the network.

The ADSL modem 230 receives a voice packet from the network The network control unit 240 receives the voice packet from the ADSL modem 230 and disassembles it. The CODEC unit 243 returns the voice coded data to analog voice. The network control unit 240 optimizes a coding delay and a line delay for the CODEC unit 243. The data returned to analog voice is subject to the path control in the sound processing unit 207 and is sounded from the handset 208.

The speech communication takes place in this manner.

The communication terminal equipment has the reading unit 212, the recording unit 211, and a FAXMODEM 205 and therefore is capable of fax communication. For fax transmission, the reading unit 212 reads data. The MODEM 205 converts the data into a modulated signal in accordance with coding technologies such as MH and MR. The modulated signal can be transmitted to the line. On the line switching network, the data is transmitted from the communication control unit 204 as modulated analog data to the line.

On the IP network, the data is transmitted from the network control unit 240 as an IP packet to the Internet line.

The communication for reception takes place in the reverse order of the above-mentioned sequence.

The CPU 201 can select lines to be connected according to originated numbers. For call origination, the CPU 201 can always select the IP network. For call reception, the CPU 201 can always use the line switching network. Using an indication or a ringing tone, the CPU 201 can notify a user which line is used for call reception. For speech communication between the slave phone and the master phone, the CPU 201 can select the slave phone for the IP network and the master phone for the line switching network. The CPU 201 can specify connection destinations for speech communication and fax communication.

The operation unit 215 and the display unit 214 are used to configure various settings for the above-mentioned connection methods. Th configured information is stored in the RAM 203.

Figure 6:
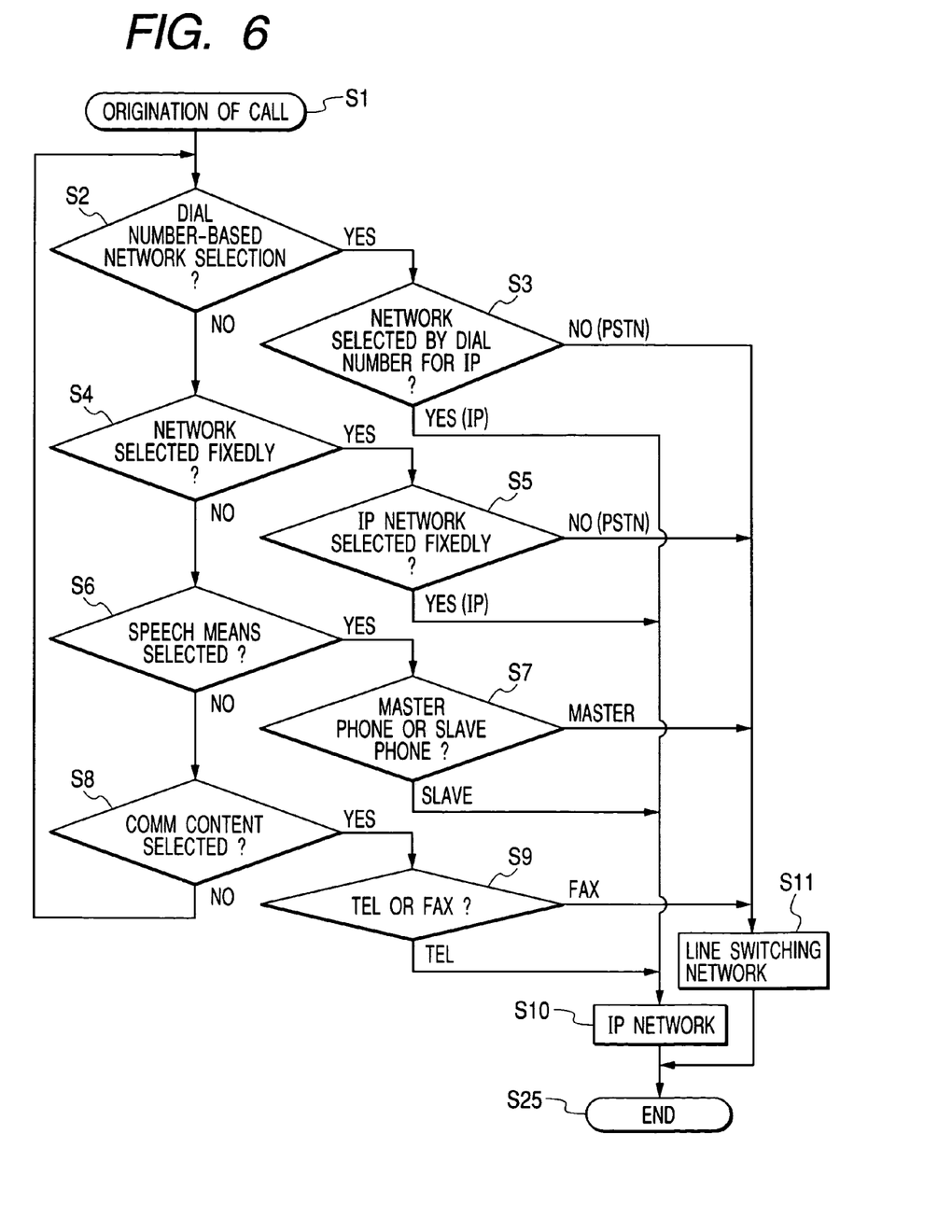
FIG. 6 is a flowchart showing a call origination operation of the information terminal equipment according to the embodiment.

FIG. 6 is a flowchart showing a call origination operation of the information terminal equipment 200 according to the embodiment. The program corresponding to this flowchart is contained in the control program stored in the ROM 202 and is executed by the CPU 201.

At step S1, the call origination operation starts from the standby state. At step S2, it is determined whether or not a user enters a dial number to select the network. When the network selection is specified, it is determined at step S3 whether or not the dial number is selected. When the dial number begins with 050, for example, the IP telephone network connection is selected. When the selection number such as 050 is followed by a number that enables the service provider selection, this can also select the connection network. When the IP network is selected, connection is made to the IP network 502 at step S10 to be ready for speech.

When any of the other numbers is selected at step S3, the line switching network 501 is selected. Such numbers include cellular phone numbers or telephone numbers that cannot be connected by the IP network 502, e.g., free dial numbers beginning with 0120 and Navi Dial numbers beginning with 0570 used for services provided by communication line companies of the line switching network. In this case, at step S11, the line switching network 501 establishes connection to be ready for speech.

At step S2, when the user does not enter a dial number to select the network, the process advances to step S4 to determine whether or not the network is selected fixedly. When the network is selected fixedly, the process advances to step S5 to determine whether or not the IP network or the PSTN network is selected fixedly. When the IP network is selected fixedly, connection is made to the IP network 502 at step S10 to be ready for speech. When the PSTN network is selected fixedly at step S5, the line switching network 501 is selected. At step S11, connection is made to the line switching network 501 to be ready for speech.

When the network is not selected fixedly at step S4, the process advances to step S6 to determine whether or not a speech means is selected. When the speech means is selected, the process advances to step S7 to select the slave phone or the master phone as the speech means. When the slave phone is selected, the IP network 502 is selected. When the master phone is selected, the fax communication may be used. In order to ensure the line quality, it is determined to select the line switching network 501. According to the selected network, connection is made to the IP network at step S10 or the line switching network at step S11 to be ready for speech.

When no speech means is selected at step S6, the process advances to step S8 to determine whether or not the communication content is selected. When the communication content is selected at step S8, the process advances to step S9 to select TEL or FAX as the communication content. When TEL is selected for voice communication, there is little possibility to cause communication problems due to the line quality. Therefore, the IP network is selected to give priority to communication costs. When FAX is selected, the line switching network is selected to ensure the line quality and prevent communication problems. According to the selected network, connection is made to the IP network at step S10 or the line switching network at step S11 to be ready for speech.

When no communication content is selected at step S8, the process returns to step S2. In this case, it is preferable to originate a call by defaulting to any one of selections at steps S2, S4, S6, and S8.

The present invention is not limited to the above-mentioned description about entering the dial number by a user to select the network at step S2, fixedly selecting the network at step S4, selecting the speech means at step S6, and selecting the communication content at step S8. The operation unit 215 may be used to set the IP or PSTN network according to user preferences. The setting information may be stored in the RAM 203. Based on this information, it may be preferable to select call origination to the IP network or the PSTN network.

Figure 7:
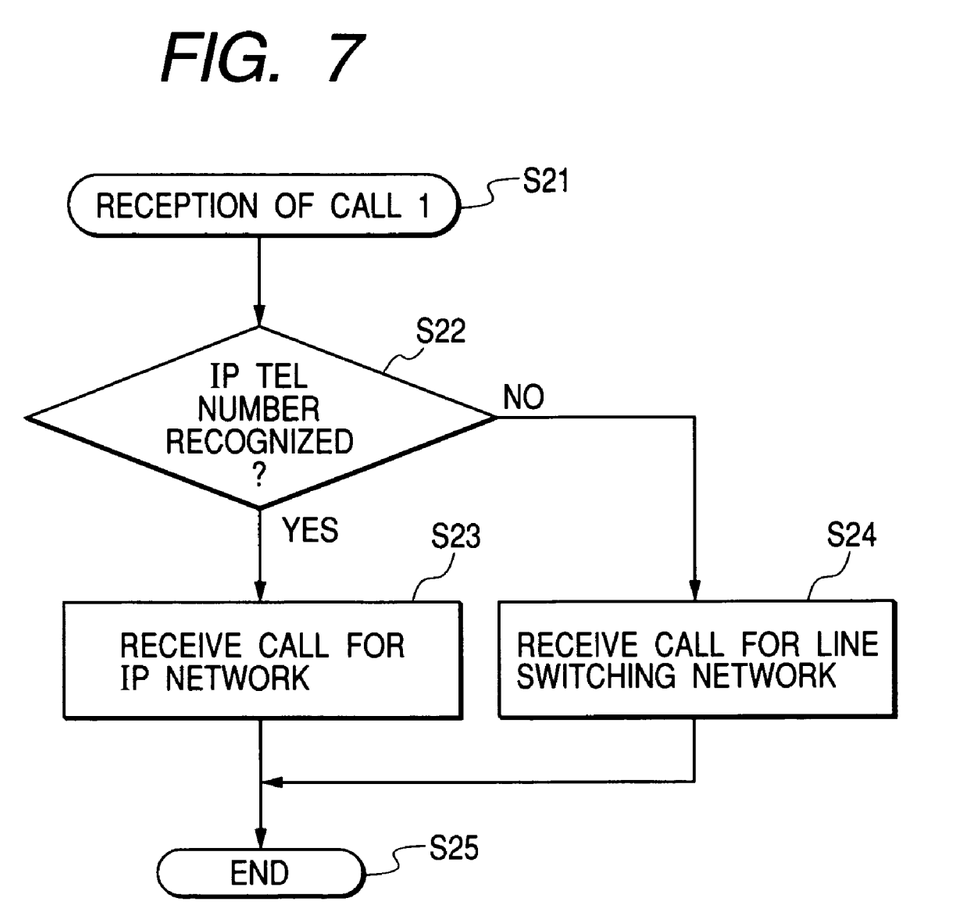
FIG. 7 is a flowchart showing a call reception operation of the information terminal equipment according to the embodiment.

FIG. 7 is a flowchart showing a call reception operation of the information terminal equipment according to the embodiment.

At step S21, the call reception operation starts from the standby state. At this time, no IP telephone number may be assigned depending on the line contract or during transition of services. Therefore, it is considered to always use the PSTN network for call reception. At step S22, it is determined whether or not an IP telephone number is available. When no IP telephone number is available, the process advances to step S24 to enable the line network reception. When an IP telephone number is assigned, a call can be also received from the IP network. The process then advances to step S23 to enable the IP network reception.

Figure 8:
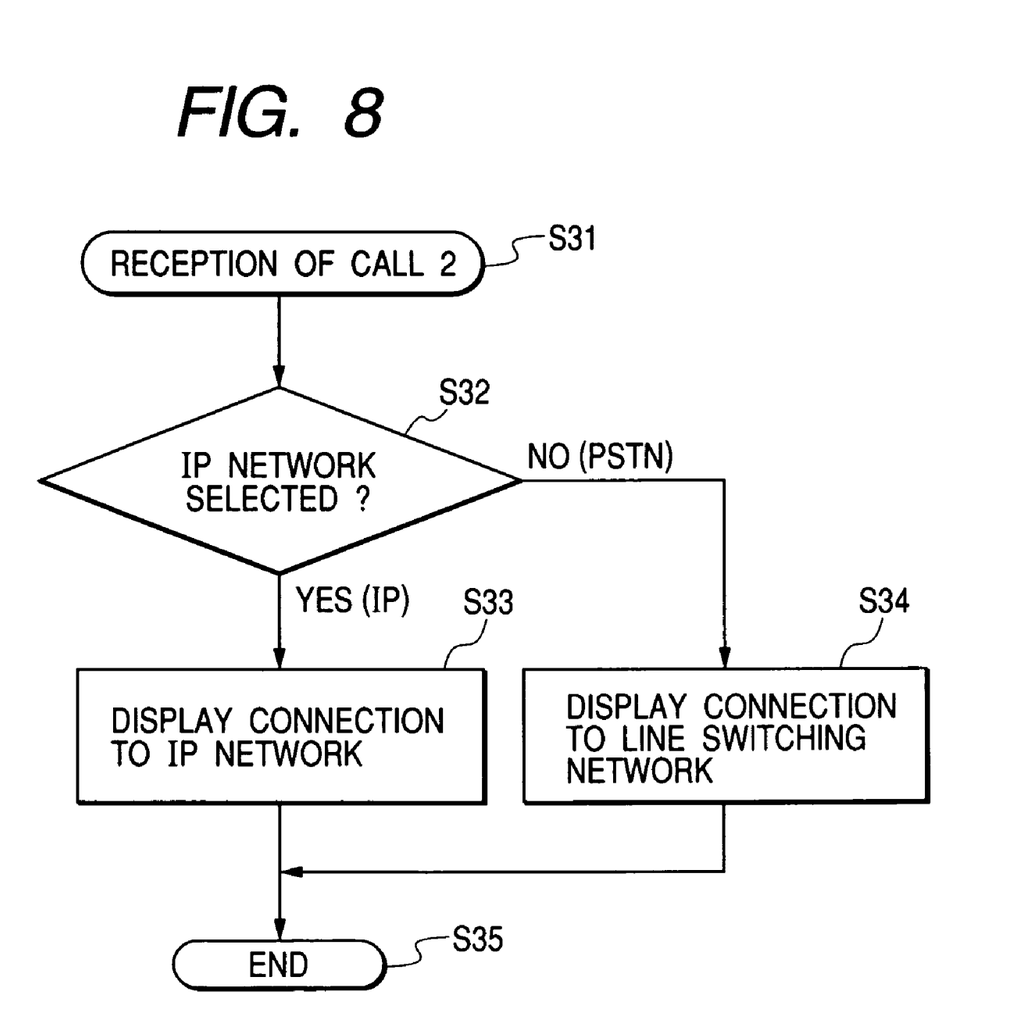
FIG. 8 is a flowchart showing a notification process at a network connection destination during the call reception operation of the information terminal equipment.

FIG. 8 is a flowchart showing a process of notifying a user which network is selected during the call reception operation in FIG. 7.

At step S31, the call reception operation starts from the standby state. At step S32, the reception network is selected. Since each reception network uses a unique interface for the reception method, the interface can be used to determine which reception network is selected. Specifically, it is possible to select the network depending on whether the CI reception is detected or the INVITE command is detected in an IP packet during SIP-based call connection. When the IP network is selected for reception, the process advances to step S33 to notify the user of the IP network connection. When the line switching network is selected for reception, the process advances to step S34 to notify the user of the line switching network connection. As a form of notification, it may be preferable to display a proper message on the display unit, generate a ringing tone, or provide an indication in appropriate color.

Figure 9:
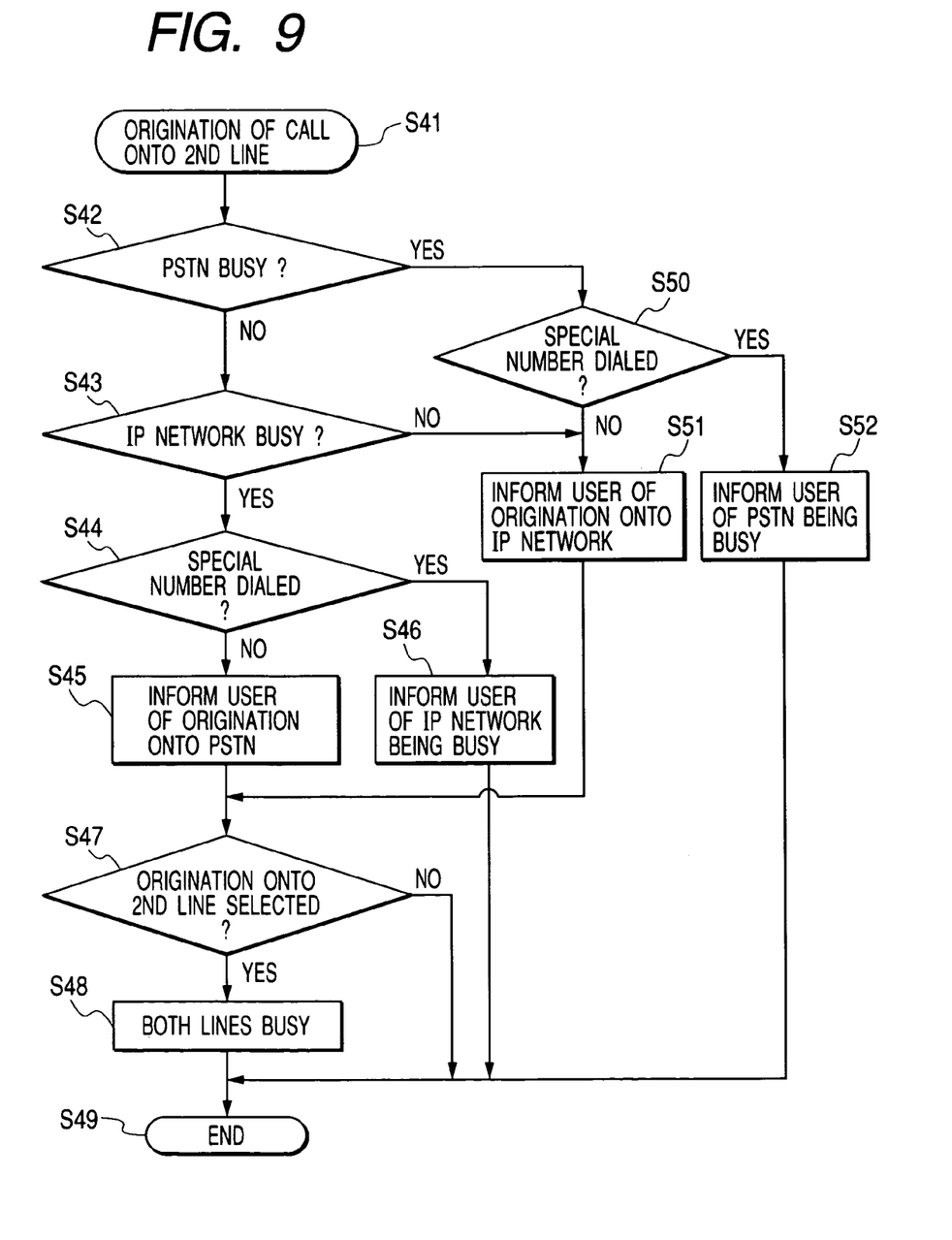
FIG. 9 is a flowchart showing a next call origination operation during the use of a first line.

FIG. 9 is a flowchart showing a next call origination operation during the use of a first line (PSTN or IP network).

At step S41, the process starts call origination onto the second line. This indicates the next call origination from the state where the first line is already busy.

At step S42, it is determined whether or not the speech on the first line takes place on the PSTN line as the public network. When the PSTN network is not used, the process advances to step S43. When the PSTN network is used, the process advances to step S50.

At step S43, it is determined whether or not the IP network line is busy. When the IP network line is busy, the process advances to step S44. When the IP network line is not busy, the process advances to step S51. When it is determined at step S44 that the dialed destination is a special number beginning with 050 or the like provided by the communication line company, the process advances to step S46. The process notifies the user that the PSTN line is busy. The process then terminates without call origination. When it is determined at step S44 that the dialed destination is not a special number, the process advances to step S45 to enable call origination onto the second line. The process notifies the user that the call origination uses the PSTN line. The notification method may be a voice message, an LCD indication, or an audible alarm.

At step S47, the user selects the call origination onto the second line based on the notified information. In this manner, the user can select the line to be disconnected at his or her own discretion. When the call origination is selected, both lines become busy at step S48, and the apparatus also becomes busy. The process terminates at step S47 without performing the call origination. When the call origination-onto the second line is not selected at step S47, the process terminates directly.

When it is determined at step S42 that the PSTN network is used as the public network, the process advances to step S50 to determine the call origination onto the second line. Since the call origination onto the second line corresponds to the IP network, some telephone numbers may not be originated and need to be examined individually. For example, the apparatus management memory is used to store not only free dial numbers beginning with 0120 and Navi Dial numbers beginning with 0570, but also dial numbers 110 and 119 as special telephone number data. A determination is made using this memory.

When the determination result shows that the dial number is not a special number, the process advances to step S51 to notify the user that the IP network is selected for the call origination. The notification method may be a voice message, an LCD indication, or an audible alarm. The process then advances to step S47.

When the determination result shows that the dial number is a special number, the process advances to step S52 to notify the user that the PSTN line is already busy. The process terminates without performing the call origination (step S49). The notification method may be a voice message, an LCD indication, or an audible alarm.

The above-mentioned embodiment enables the simultaneous 2-line speech using the analog telephone on the PSTN line and the digital telephone based on the IP phone function. This makes it possible to decrease busy states and use advanced functions equivalent to additional services such as Catch Phone without subscribing to such services. Therefore, it is possible to reduce costs and improve operability.

OTHER EMBODIMENTS

While there has bee described the embodiment of the present invention, the present invention can be embodied as a system, an apparatus, a method, a program, a storage medium, and the like. The present invention may be applied to a system comprising a plurality of devices or to a system comprising a single device.

The present invention includes the following case of embodying the invention. A system or an apparatus is directly or remotely supplied with a software program to implement the functions of the above-mentioned embodiment. A computer in the system or the apparatus reads and executes the supplied program code. In this case, as long as the program function is provided, it need not be embodied as a program.

Accordingly, the program code itself installed in the computer also embodies the present invention to embody the functions and processes of the present invention on computers. That is to say, the scope of claims includes the computer program itself to embody the functions and processes of the present invention.

As long as the program function is provided, the program may be available in any forms such as an object code, an interpreter-based program, OS-supplied script data, and the like.

Recording media for supplying the program include, e.g., flexible disk, hard disk, optical disk, magnetic optical disk, MO, CD-ROM, CD-R, CD-RW, magnetic tape, nonvolatile memory card, ROM, and DVD (DVD-ROM, DVD-R).

There are the other methods of supplying the program. A user accesses an Internet homepage using a client computer's browser. From the homepage, the user can download the computer program itself according to the present invention or an equivalent compressed file containing an automatic installation function on to a recording medium such as a hard disk. Alternatively, it is possible to divide program codes constituting the program according to the present invention into a plurality of files. The user can download the respective files from different homepages. That is to say, the claims of the present invention include a WWW server that allows a plurality of users to download program files for implementing the present invention's functions and processes on computers.

The program according to the present invention can be encrypted and stored on storage media such as CD-ROM for distribution to users. Authenticated users are permitted to download key information for decryption from the homepage via the Internet. Using the key information, users can execute the encrypted program and install it on computers to embody the invention.

The computer reads the program and executes it to implement the functions of the above-mentioned embodiments. Based on the program's instructions, the OS running on the computer and the like can perform part or all of actual processes to implement the functions of the embodiments.

Further, the program is read from the recording media and is written to memory on an expansion board inserted into the computer or on an expansion unit connected thereto. Based on the program's instructions thereafter, the CPU and the like on the expansion board or the expansion unit can perform part or all of actual processes to implement the functions of the embodiments.

The present invention can provide a communication apparatus accommodating both a LAN line or a broadband line and an ordinary public network (PSTN) so as to enable the simultaneous use of two lines according to two network connection methods by using a single physical line capable of accommodating the high-speed line and the public network.

What is claimed is:

1. A communication apparatus comprising a master phone, a slave phone, a facsimile, a first communication means for telephone communication via a public network using a specified communication cable, and a second communication means for telephone communication via an IP network using the communication cable, the apparatus further comprising:
a selection means for selecting one of the first and second communication means based on a user indication; and
a control means for, during communication using one of the communication means selected by the selection means, controlling communication using the other communication means based on a user instruction,
wherein said selection means selects the first communication means in a case where the user indication indicates to use the master phone, said selection means selects the second communication means in a case where the user indication indicates to use the slave phone, said selection means selects the first communication means in a case where the user indication indicates to use the facsimile, and said selection means selects the second communication means in a case where the user indication indicates to use the second communication means.

2. A method of controlling a communication apparatus comprising a master phone, a salve phone, a facsimile, a first communication means for telephone communication via a public network using a specified communication cable, and a second communication means for telephone communication via an IP network using the communication cable, the method comprising the steps of:

selecting one of the first and second communication means based on a user indication; and during communication using one of the communication means selected by the selecting step, controlling communication using the other communication means, based on a user instruction, wherein said selecting step selects the first communication means in a case where the user indication indicates to use the master phone, said selecting step selects the second communication means in a case where the user indication indicates to use the slave phone, said selecting step selects the first communication means in a case where the user indication indicates to use the facsimile, and said selecting step selects the second communication means in a case where the user indication indicates to use the second communication means.

3. A computer-readable storage medium on which is stored a computer-readable program for controlling a communication apparatus comprising a master phone, a slave phon, a facsimile, a first communication means for telephone communication via a public network using a specified communication cable, and a second communication means for telephone communication via an IP network using the communication cable, the program comprising the steps of:

selecting one of the first and second communication means based on a user indication; and during communication using one of the communication means selected by the selecting step, controlling communication using the other communication means, based on a user instruction, wherein said selecting step selects the first communication means in a case where the user indication indicates to use the master phone, said selecting step selects the second communication means in a case where the user indication indicates to use the slave phone, said selecting step selects the first communication means in a case where the user indication indicates to use the facsimile, and said selecting step selects the second communication means in a case where the user indication indicates to use the second communication means.

* * * * *